(12) United States Patent
Chan et al.

(10) Patent No.: US 10,181,814 B2
(45) Date of Patent: Jan. 15, 2019

(54) SOLAR BATTERY SYSTEM FOR LOW TEMPERATURE OPERATION

(71) Applicants: Wilson Chan, San Jose, CA (US); Chu Chi Kuo, Hsinchu (TW)

(72) Inventors: Wilson Chan, San Jose, CA (US); Chu Chi Kuo, Hsinchu (TW)

( * ) Notice: Subject to any disclaimer, the term of this patent is extended or adjusted under 35 U.S.C. 154(b) by 0 days.

(21) Appl. No.: 15/266,950

(22) Filed: Sep. 15, 2016

(65) Prior Publication Data
US 2017/0194811 A1 Jul. 6, 2017

Related U.S. Application Data
(60) Provisional application No. 62/219,102, filed on Sep. 15, 2015.

(51) Int. Cl.
| | | |
|---|---|---|
| H02J 7/00 | (2006.01) | |
| H02J 7/16 | (2006.01) | |
| H02J 7/35 | (2006.01) | |
| H02S 40/32 | (2014.01) | |
| H02S 40/34 | (2014.01) | |
| H02S 40/40 | (2014.01) | |
| H02S 40/38 | (2014.01) | |
| H02J 7/04 | (2006.01) | |

(52) U.S. Cl.
CPC ............ *H02S 40/32* (2014.12); *H02J 7/047* (2013.01); *H02S 40/34* (2014.12); *H02S 40/38* (2014.12); *H02S 40/40* (2014.12); *H02J 7/0016* (2013.01); *H02J 7/35* (2013.01); *Y02E 10/566* (2013.01)

(58) Field of Classification Search
CPC ............ H02J 7/047; H02J 7/0016; H02J 7/35; H02S 40/32; H02S 40/34; H02S 40/40; Y02E 10/566
USPC ........ 320/101, 107, 122, 125, 138, 153, 160
See application file for complete search history.

(56) References Cited

U.S. PATENT DOCUMENTS

| | | | | |
|---|---|---|---|---|
| 5,875,085 | A * | 2/1999 | Farley ................. | H01L 27/0248 257/E29.255 |
| 6,027,076 | A * | 2/2000 | Krause ................... | B64G 1/425 244/158.1 |
| 9,620,975 | B2 * | 4/2017 | Naskali ................. | H02J 7/0054 |
| 9,778,245 | B2 * | 10/2017 | Grimberg ............... | G01N 33/48 |
| 9,866,098 | B2 * | 1/2018 | Yoscovich .............. | H02M 1/00 |
| 9,954,480 | B2 * | 4/2018 | Haynes ................. | H01L 31/048 |
| 9,978,275 | B2 * | 5/2018 | Myer ............... | G08G 1/096783 |
| 10,094,525 | B2 * | 10/2018 | Kaag .................. | H05B 33/0854 |
| 2002/0146617 | A1 * | 10/2002 | Johnson ................. | B64G 1/425 429/50 |
| 2003/0038610 | A1 * | 2/2003 | Munshi ..................... | H02J 7/35 320/101 |
| 2008/0053716 | A1 * | 3/2008 | Scheucher ............... | B60L 8/00 180/2.1 |
| 2008/0309288 | A1 * | 12/2008 | Benckenstein ....... | H02J 7/0016 320/119 |
| 2009/0039827 | A1 * | 2/2009 | Fowler .................... | H02J 7/355 320/101 |
| 2009/0268415 | A1 * | 10/2009 | Anupindi ................ | H01M 2/34 361/748 |

(Continued)

*Primary Examiner* — Phallaka Kik
(74) *Attorney, Agent, or Firm* — Wang Law Firm

(57) ABSTRACT

A power delivery device is disclosed, comprising at least one solar panel, a battery pack comprising at least one battery, and a heater, wherein the device is configured to measure the temperature of the battery pack and power the heater to heat the battery pack if it is too cold for optimal charging.

13 Claims, 6 Drawing Sheets

(56) References Cited

U.S. PATENT DOCUMENTS

| | | | |
|---|---|---|---|
| 2010/0013428 A1* | 1/2010 | Shin | H02J 7/35 320/101 |
| 2011/0248667 A1* | 10/2011 | Umeoka | B60K 16/00 320/101 |
| 2011/0279085 A1* | 11/2011 | Shigemizu | H01M 10/441 320/117 |
| 2012/0300440 A1* | 11/2012 | Miyamae | H01M 10/465 362/183 |
| 2012/0319658 A1* | 12/2012 | White | H02J 7/0016 320/134 |
| 2013/0026989 A1* | 1/2013 | Gibbs | H01M 10/441 320/116 |
| 2013/0099721 A1* | 4/2013 | Azzam | H02J 7/0063 320/101 |
| 2014/0042815 A1* | 2/2014 | Maksimovic | H02J 1/00 307/63 |
| 2014/0070768 A1* | 3/2014 | Chen | H02J 7/0029 320/109 |
| 2015/0022004 A1* | 1/2015 | Okuda | H02J 3/32 307/66 |
| 2015/0028677 A1* | 1/2015 | Iwasaki | H02J 9/06 307/52 |
| 2015/0142237 A1* | 5/2015 | Wu | B60L 1/003 701/22 |
| 2015/0166045 A1* | 6/2015 | Chen | B60L 1/003 701/22 |
| 2015/0372527 A1* | 12/2015 | Lim | H02J 7/0091 320/150 |
| 2016/0023563 A1* | 1/2016 | Wang | B60L 11/187 320/129 |
| 2016/0042630 A1* | 2/2016 | Cho | H04L 12/2825 340/517 |
| 2016/0111900 A1* | 4/2016 | Beaston | H02J 7/0021 320/134 |
| 2016/0190812 A1* | 6/2016 | Myer | G08G 1/096783 307/21 |
| 2016/0270188 A1* | 9/2016 | Kaag | H05B 33/0854 |
| 2016/0374146 A1* | 12/2016 | Ellis | E06B 5/10 |
| 2017/0271912 A1* | 9/2017 | Bhowmik | H02S 50/00 |
| 2018/0195741 A1* | 7/2018 | Field | F24D 11/003 |

\* cited by examiner

SOLAR BATTERY SYSTEM FOR LOW TEMPERATURE OPERATION

CROSS-REFERENCE TO RELATED APPLICATIONS

The present application takes priority from Provisional App. No. 62/219,102, filed Sep. 15, 2015, which is herein incorporated by reference.

BACKGROUND

Field of the Invention

The present invention generally relates to solar energy, and more specifically relates to a solar power system incorporating battery storage.

Background of the Invention

Solar power is highly useful for applications where long-term, remote operation is desired, such as lights, road signs, security cameras, and so on. Since some of those devices need to operate at night as well, a battery to store the solar energy accumulated during the day is useful.

One problem associated with batteries, particularly lithium batteries, is that they typically do not charge very well in low temperatures, rendering them less useful for outdoor applications in cold climates. While a battery can still release power in low temperatures, it cannot be charged in such conditions. This means that the solar energy released on a cold, sunny day would be wasted, and the device would not be able to operate at night—even though if the battery were fully charged, it could operate just fine.

For example, the temperature range in which a NiMH battery can be charged is 0° C. to 45° C.; the temperature range in which it can be discharged is −20° C. to 65° C. The ranges are similar for Li-ion batteries; the temperature range for charging is 0° C. to 45° C. and for discharging is −20° C. to 60° C. While temperatures in excess of 45° C. are uncommon, temperatures below 0° C. are extremely common in the winter in some locations, and it is also quite common for temperatures to not rise to 0° C. at all on a winter day; thus, an outdoor solar-powered battery would not be able to be charged at all on those days, even though it could be discharged.

A need exists for a solar-charged battery that can operate in a wide range of temperatures and that can be optimally charged even when the ambient temperature is low.

SUMMARY OF THE INVENTION

An object of the present invention is to provide a solar energy system comprising a battery that can operate in a wide range of ambient temperatures.

Another object of the present invention is to provide a solar energy system comprising a battery where the battery may be charged even when the ambient temperature is low.

Another object of the present invention is to provide a solar energy system that can operate during the day and at night in a wide range of ambient temperatures.

The system of the present invention comprises a battery pack comprising at least one battery, a heater located so that it can provide heat to the battery pack, a temperature sensor that can measure the temperature of the battery pack, at least one solar panel, an output circuit for delivering electric power, and a controller that can receive temperature data from the temperature sensor, determine whether or not the battery pack needs to be charged, determine whether the at least one solar panel is producing power, and if the battery pack needs to be charged and the solar panel is producing power, charging the battery if its temperature is within the optimal range for charging, and heating the battery if its temperature is below the optimal range for charging.

In an embodiment, the present invention also comprises a communication module connected to the controller, said communication module enabling the controller to communicate with a mobile device.

In an embodiment, the present invention also comprises a user interface.

In an embodiment, the controller is further configured to determine whether or not the at least one solar panel is receiving power. If it is, the solar power is used to power the output circuit. If any excess power remains after powering the output circuit, it is used to charge the battery pack. If the at least one solar panel is not receiving power, the battery pack is used to power the output circuit.

In an embodiment, the system also comprises at least one micro-inverter that converts the output to AC.

In an embodiment, the system also comprises an enclosure for containing the battery pack, controller, heater, and temperature sensor; the enclosure is preferably waterproof, dustproof, or both.

The method of the present invention comprises using a solar panel to generate solar energy, determine whether or not a battery pack requires charging, determining the temperature of the battery pack, and if the temperature of the battery pack is too low for charging and the battery pack requires charging, using the solar energy to power a heater to heat the battery pack. The battery pack is then charged once it reaches the needed temperature. If the battery pack is charging and the solar panel is receiving more power than needed, the remaining power goes to an output circuit. If the battery pack is fully charged, all of the solar power goes to an output circuit. If the battery pack is fully or partially charged and the solar panel is not receiving power, the battery pack is used to power the output circuit.

In an embodiment, the present invention comprises over-current and overvoltage protections. If the voltage or current generated by the solar panel is excessive, the charging process stops.

In an embodiment, the cell balancing circuit of the battery pack comprises at least two battery connected in series and bypass circuits that may be switched on and off. If any one of the battery is charged at any point during the charging process while at least one other battery still requires charging, the system turns on a bypass circuit within the battery pack to bypass the charged battery to improve effective operating time and cycle life.

In an embodiment, a micro-inverter is used to generate alternating current at the output circuit.

In an embodiment, the system of the present invention comprises at least one solar panel connected to a bus, a battery pack comprising at least one battery connected to the bus, and at least one micro-inverter connected to the bus. The battery pack comprises a heater, a temperature sensor, and a charging circuit. A controller is connected to the battery pack, the charging circuit, the at least one micro-inverter, the temperature sensor, and the heater, and performs the following functions. If the battery pack is charging, the controller measures the temperature of the battery pack. If its temperature is ever below a predetermined temperature, the charging circuit is turned off and the heater is turned on to heat the battery pack until it reaches the predetermined temperature. The controller also monitors the voltage at the bus. If the voltage at the bus is below a predetermined setpoint voltage and the solar panel is receiving power, the micro-inverter is turned off and the battery is charged. If the voltage at the bus is at or above a predetermined maximum voltage (higher than the setpoint voltage), and the solar panel is generating more power than the maximum power of the micro-inverter, the battery is charged if it requires charging and the remaining power goes to power the micro-inverter; if the battery is fully charged, the micro-inverter is turned on to maximum power and the charging circuit is turned off.

LIST OF FIGURES

DETAILED DESCRIPTION OF THE PREFERRED EMBODIMENT

Figure 1:
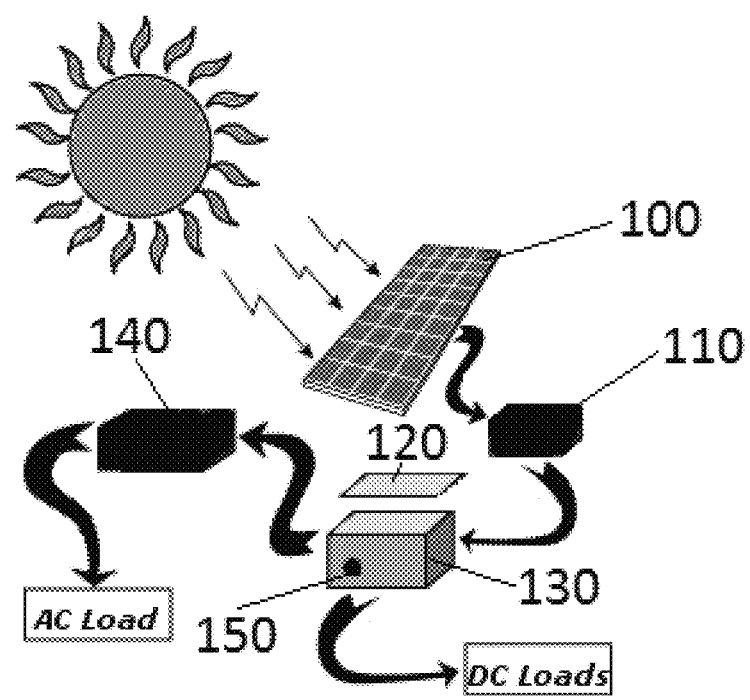
FIG. 1 shows a schematic diagram of the preferred embodiment of the present invention.

As shown in FIG. 1, the preferred embodiment of the present invention preferably comprises at least one solar panel 100, a controller 110, a battery pack 130, and a heater 120 and a temperature sensor 150 located on the battery pack. The controller 110 is connected to the heater 120 and to the temperature sensor 150, and is also connected to the battery charging circuit (not shown). For AC applications, a micro-inverter 140 is used to convert the output current to AC.

The present invention preferably operates as follows. Temperature sensor 150 measures the temperature of the battery pack 130. The controller 110 receives the temperature information, along with information on whether the solar panel 100 is producing energy and information on whether the battery pack needs to be charged. If the solar panel 100 is producing energy and the battery pack 130 needs to be charged, and if the temperature of the battery pack is within the optimal range for charging, the battery charging circuit is used to charge the battery pack. If the solar panel 100 is producing energy, the battery pack needs to be charged, but the temperature of the battery pack is below the optimal range, the controller turns off the battery charging circuit and turns on the heater. The battery pack is heated until its temperature falls into the optimal range for charging, and then charged.

In the preferred embodiment, the temperature sensor monitors the battery pack continuously. If the battery pack's temperature falls below the optimal range at any time, the controller turns off the battery charging circuit, turns on the heater, and heats the battery pack until its temperature falls into the optimal range for charging.

The optimal temperature range for charging varies depending on the type of battery used. In the preferred embodiment, NiMH or Li-ion batteries are used. The temperature range at which a NiMH or a Li-ion battery can be charged is 0° C. to 45° C.; thus, if the temperature sensor detects a battery temperature that is below 0° C., the controller turns on the heater and heats the battery pack until its temperature reaches at least 0° C. The battery pack is then charged.

Most batteries have a narrower temperature range at which the battery can be charged fast. For example, for a NiMH battery, the temperature range for fast charging is 10° C.–30° C. In an embodiment, the controller turns on the heater any time the temperature sensor detects a battery temperature that is below the range for fast charging (even if the battery can be charged at that temperature), and heats the battery until its temperature reaches at least the lower bound of the range for fast charging.

In the preferred embodiment, over voltage protection and over current protection circuits are used to protect the battery pack. Any over-voltage or over-current stops the charging or the discharging process. It will, however, be understood that these protections are not required for practicing the present invention.

The battery pack preferably comprises at least one battery. For embodiments where the battery pack comprises more than one battery, the batteries are preferably connected in series. However, any method of connecting the batteries may be used for practicing the present invention.

The batteries used in the battery pack are preferably identical, to facilitate charging. However, it is not required for practicing the present invention for the batteries to be identical.

Figure 2:
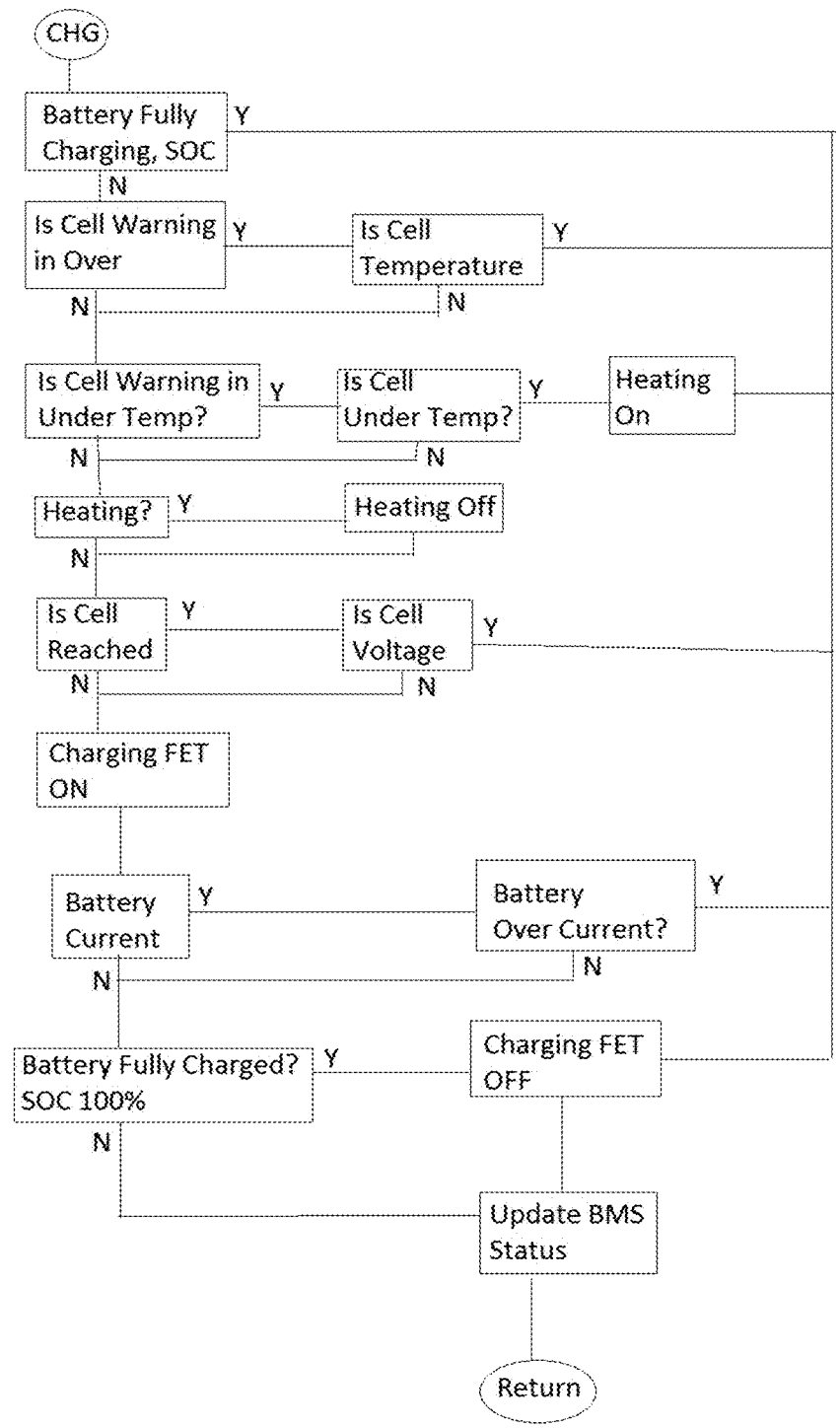
FIG. 2 shows a flowchart for the charging process for the preferred embodiment of the present invention.

FIG. 2 is a flowchart showing the algorithm for the operation of the system of the preferred embodiment of the present invention, using a charging FET as the battery charger. If the battery is fully charged, the charging FET is turned off. If the battery is not fully charged, the system then reads the battery temperature. If the battery temperature is under the lower bound of the acceptable temperature range, the heater is turned on. Once the battery temperature is within the acceptable temperature range, the heater is turned off. The system next reads the voltage of the battery and determines whether or not it is at a high voltage level. If it is not, the charging FET is turned on and the battery begins to charge. If the voltage is high, the system next checks whether or not it is too high; if it is too high, the overvoltage protection (OVP) is turned on and the charging FET is not turned on. The system also checks whether the battery current is too high; if it is too high, the over current protection (OCP) is turned on and the charging FET is turned off. Once the battery is fully charged, the charging FET is turned off and the battery status is updated.

Figure 3:
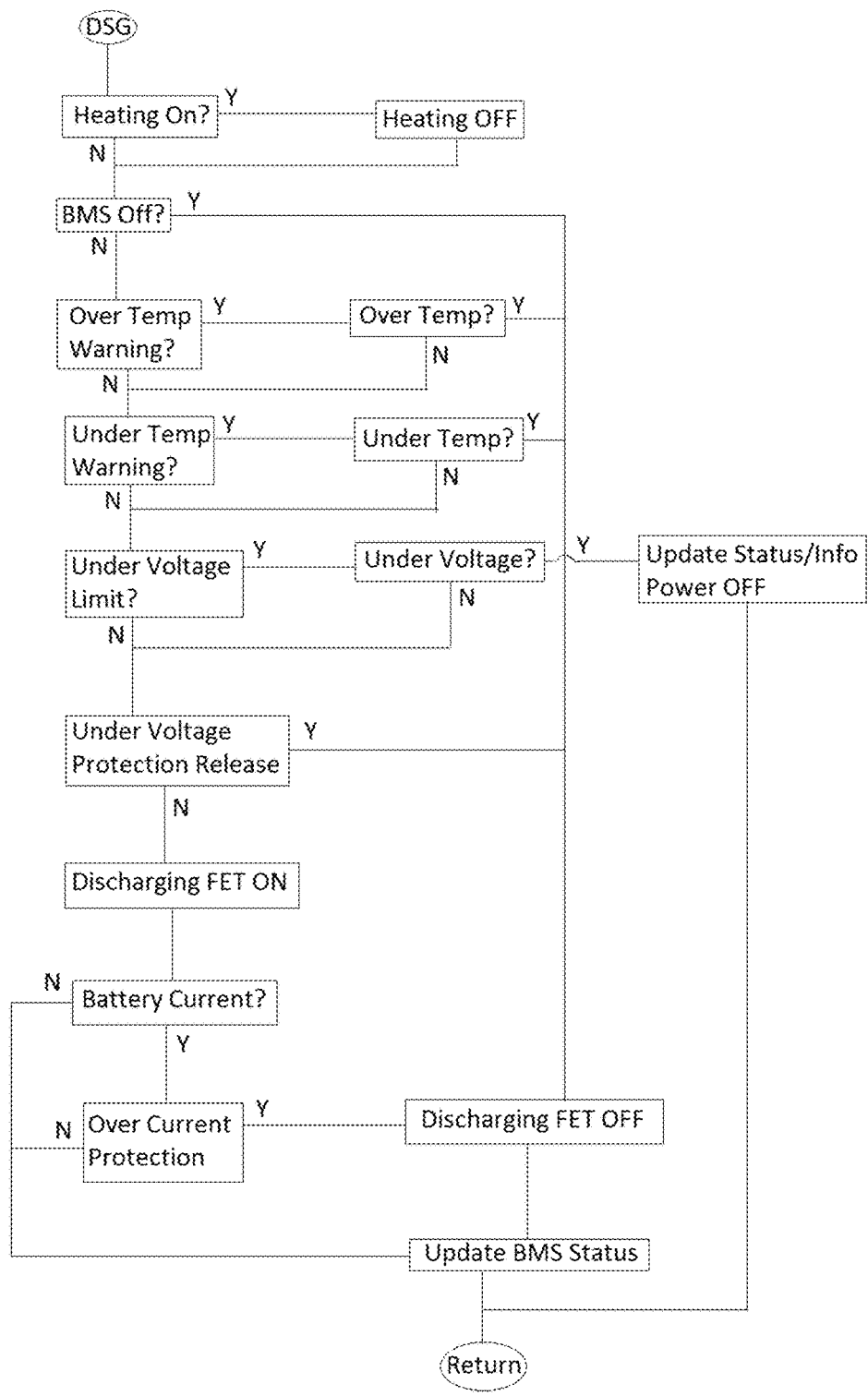
FIG. 3 shows a flowchart for the discharging process for the preferred embodiment of the present invention.

FIG. 3 is a flowchart showing the discharge process for the battery. First of all, the heater is turned off (it is not needed to heat the battery during discharging, as the acceptable temperature range for discharging is wider for NiMH and Li-ion batteries than it is for charging). If the system receives an OFF command, the discharging FET is turned off. If it does not, the system next checks whether or not the temperature is over or under the acceptable range for discharging (which may, as mentioned, be different from the acceptable range for charging). If it is outside the acceptable range, the discharging FET is turned off. Next, the system checks whether the battery has a low voltage, and turns off the discharging FET if it does. It also turns off the discharging FET if the under voltage protection (UVP) circuit is triggered. If the battery does not have a low voltage and the UVP is not triggered, the discharging FET turns on. The system then checks to see whether the battery is producing current; if it is, the system checks to see whether the over current protection (OCP) is turned on. If it is, the discharging FET is turned off and the status of the system is updated.

It will be understood that even though a charging FET and discharging FET are used for the preferred embodiment of the present invention, other battery charging and discharging circuits known in the art may also be used.

The temperature sensor is preferably a thermocouple located directly on the battery. Other temperature sensors capable of detecting the temperatures likely to be encountered by the system of the present invention are also acceptable for practicing the present invention.

The controller is preferably a high system level integration RISC MCU platform with high precision 16-bit coulomb counting ADC. It preferably comprises an EEPROM to store manufacturer data and a history log, and any other data required for the operation of the system. However, any other similar processor and memory may be used for this purpose.

The present invention preferably comprises a communication module. The communication module may be used for communicating between the controller and a mobile device such as a smartphone or tablet, or between the controller and the Internet. Any communications protocol may be used for this purpose; wi-fi is preferable.

The present invention preferably comprises a user interface. In the preferred embodiment, the user interface comprises at least one LED as a status display; however, the present invention may also communicate user interface data to and from a smartphone or tablet. The present invention may also use buttons, switches, or other input methods for entering information, and a display for displaying battery status information, temperature data, and other relevant information.

Since the present invention is preferably used in outdoor application, it preferably comprises a rugged and waterproof/dustproof case to keep the system from getting damaged. In the preferred embodiment, the case is compliant with the IP65 standard.

The present invention has many applications. One group of potential applications is freestanding DC applications—electric power devices that are not connected to the grid. For example, the system of the present invention may be used to power streetlights, road signs, outdoor security cameras, portable electronic devices, and so on. Any size or type of battery may be used with the present invention; similarly, any size or type of solar panel may be used. Another group of potential applications for the present invention are grid applications; the present invention may be plugged into the electric grid to generate energy. For those applications, at least one micro-inverter should be used to convert the output of the system to AC. The micro-inverters have to match the wattage of the solar panels used; i.e. if 4 kW solar panels are used, 4 kW of micro-inverters have to be used.

Figure 4:
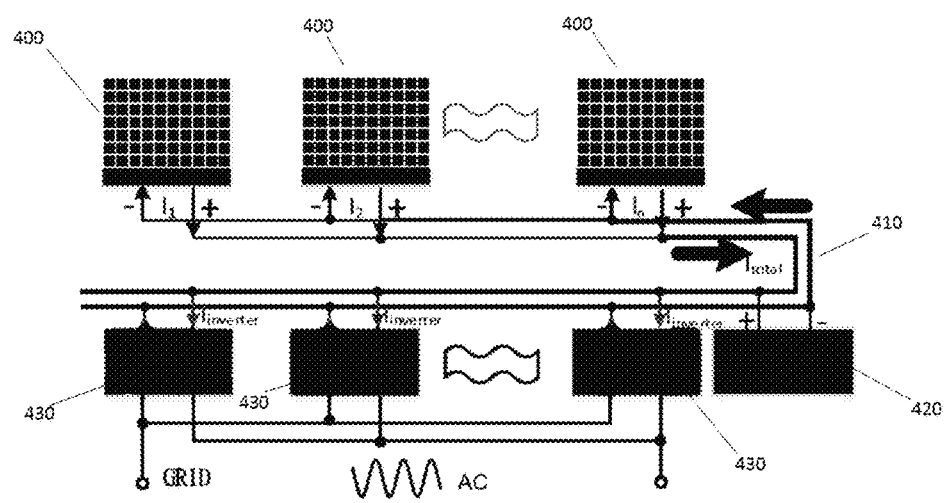
FIG. 4 shows a schematic diagram for an AC-output embodiment of the present invention.

FIG. 4 shows a diagram of one embodiment of the system of the present invention comprising micro-inverters for AC output. A plurality of solar panels 400 are connected to a low voltage DC bus 410. Battery pack 420 is also connected to the low voltage DC bus 410. Battery pack 420 also includes a heater and a temperature sensor (not shown), and a charging circuit (not shown). A plurality of micro-inverters 430 are connected to the low voltage DC bus 410 and provide AC output (in the diagram, they are connected to the grid, however this is not essential for practicing the present invention).

Figure 5:
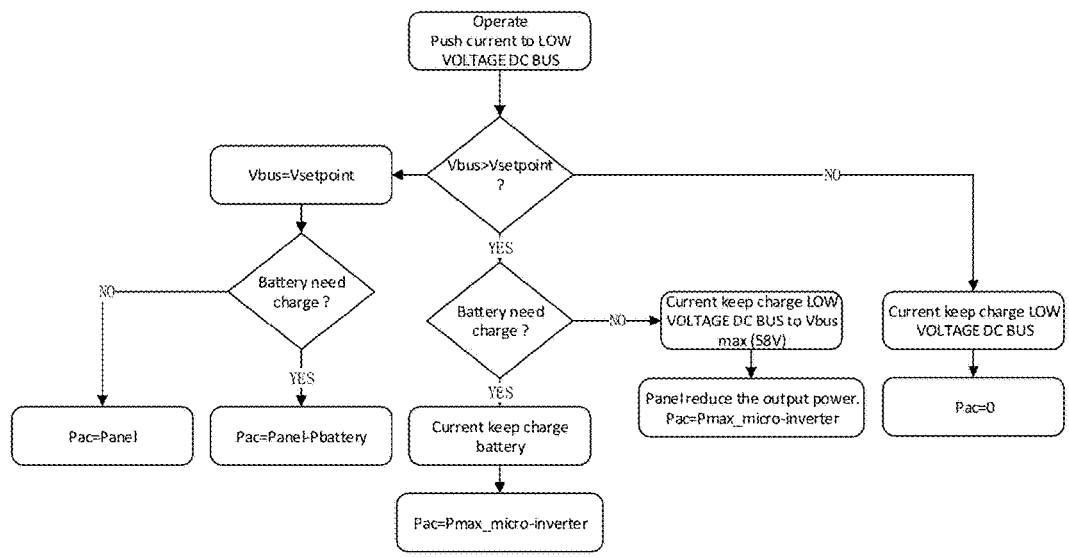
FIG. 5 shows a flowchart for the operation of an AC-output embodiment of the present invention.

FIG. 5 shows a flowchart for the operation of the system described in FIG. 4. When the battery pack is not charged and the solar panel receives power, current is pushed to the low voltage DC bus. If the voltage at the low voltage DC bus is below a predetermined setpoint voltage Vsetpoint, the micro-inverters are not turned on and all of the solar power is used to charge the battery pack.

As the battery pack is charged, the voltage at the low voltage DC bus rises. Once the voltage is above Vsetpoint, the micro-inverters are turned on and the system outputs power while continuing to charge the battery pack. After the battery pack is fully charged, assuming the solar panels keep generating maximum power, the micro-inverters are turned on to maximum power.

As the day goes on, the amount of sunshine reaching the solar panels drops. The solar panels no longer generate as much power and the voltage at the low voltage DC bus drops. If the solar panels can still keep generating enough power to keep operating the micro-inverters at their maximum power, the battery pack is not discharged. Once the solar panels no longer generate enough power to keep operating the micro-inverters at their maximum power, the battery pack is discharged to make up the difference.

At night, solar panels do not generate any power. Once the solar panels stop producing power, the battery pack is used to power the micro-inverters until it is fully discharged.

It will be understood that at any point during the process of charging the battery pack, if the battery pack gets too cold for efficient charging to take place, the charging process will halt and the heater will be turned on until the battery pack reaches a temperature that is within the optimal range for charging. The charging process will then resume.

Figure 6:
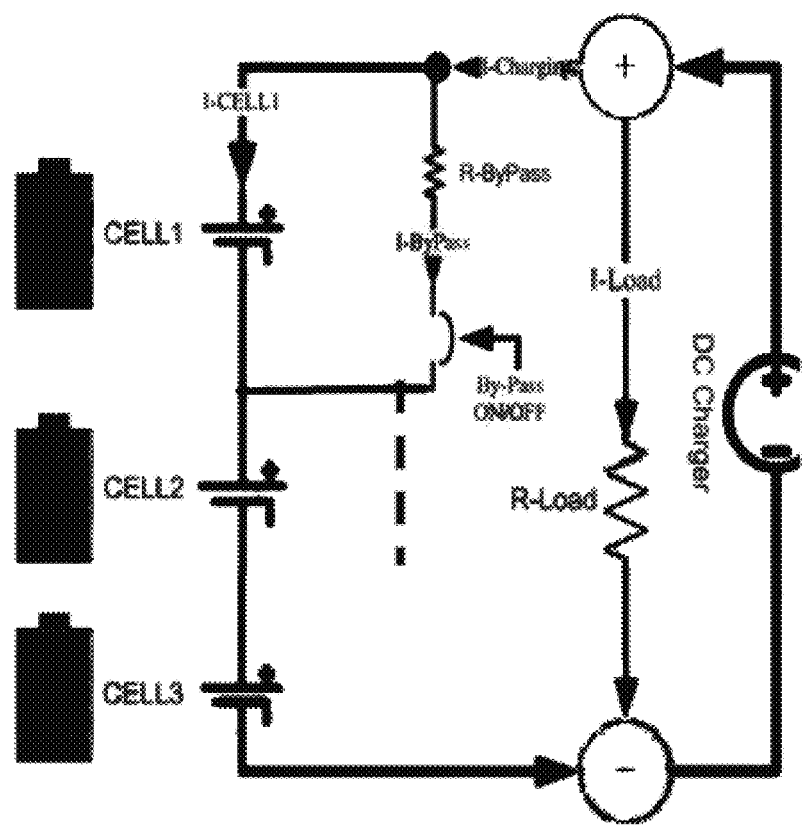
FIG. 6 shows a cell balancing circuit of an embodiment of the present invention.

FIG. 6 shows an exemplary embodiment of a cell balancing circuit for the battery pack. The purpose of the cell balancing circuit is to bypass a fully charged battery cell during charging, so that energy is not wasted and cycle life is improved. As shown in the Figure, a bypass circuit is provided for each battery cell, comprising a resistor R-bypass and a switch. In the preferred embodiment, if the voltage of any battery cell is determined to exceed the average voltage for all the batteries by a predetermined amount, the switch of the bypass circuit for that battery cell is turned on and the battery cell is bypassed. The predetermined amount is 300 mV in the preferred embodiment, but can be any amount.

Exemplary embodiments are described above. It will be understood that the present invention comprises many other embodiments that may be considered reasonable equivalents to the embodiments described above, and is limited only by the appended claims.

The invention claimed is:

1. A solar energy system, comprising:
a battery pack comprising at least one battery;
a heater located in such a way as to provide heat to the battery pack;
a temperature sensor located in such a way as to measure the temperature of the battery pack;
at least one solar panel;
an output circuit for delivering electric power;
a controller comprising a processor and memory, said controller configured to perform the following functions:
receive temperature data from the temperature sensor;
receive voltage data from the at least one battery and determine whether or not the at least one battery is fully charged;
determine whether the at least one solar panel is producing power;
if the at least one solar panel is producing power, the at least one battery is not fully charged, and the thermometer is indicating a temperature within a range that is favorable for battery charging, charging the battery pack using the power produced by the solar panel;
if the solar panel is producing power and the thermometer is indicating a temperature that is too low for battery charging, turning on the heater and heating the battery until the thermometer indicates a temperature within a range that is favorable for battery charging.

2. The system of claim 1, wherein the battery pack comprises at least two batteries connected in series, wherein the battery pack also comprises at least two bypass circuits, the number of bypass circuits equal to the number of batteries and each bypass circuit wired to bypass one battery, each bypass circuit comprising a switch, wherein the controller is further configured to:
during charging, determine the voltage of each battery;
during charging, for each battery, if its voltage exceeds the average voltage of all the batteries by a predetermined amount, turning on the switch to activate the bypass circuit for that battery.

3. The system of claim 1, where the battery pack comprises at least two batteries, wherein the at least two batteries are identical.

4. The system of claim 1, further comprising:
a communication module, said communication module capable of communicating with a mobile device, said communication module connected to the controller.

5. The system of claim 1, further comprising:
a user interface, said user interface connected to the controller.

6. The system of claim 1, wherein the controller is further configured to perform the following functions:
determine whether or not the at least one solar panel is receiving power;
if the solar panel is receiving power, using the power received by the at least one solar panel to power the output circuit;
if the at least one solar panel is receiving more power than necessary to power the output circuit, using any excess power to charge the battery pack;
if the at least one solar panel is not receiving power, using the battery pack to power the output circuit.

7. The system of claim 1, further comprising:
at least one micro-inverter connected to the output circuit in such a way as to generate alternating current.

8. The system of claim 1, further comprising:
an enclosure that contains the battery, controller, heater, and temperature sensor, wherein the enclosure is at least one of the following: waterproof, dustproof.

9. A method of delivering solar energy, comprising:
using a solar panel to generate solar energy;
determining whether or not a battery pack requires charging;
determining the temperature of the battery pack;
if the battery pack requires charging and the temperature of the battery pack is too low for optimal charging, using the solar energy to power a heater to heat the battery pack;
if the battery pack requires charging and the temperature of the battery pack is adequate for optimal charging, using the solar energy to charge the battery pack;
if the battery pack is charging and the amount of solar power provided by the solar panel is greater than the amount of energy needed to charge the battery pack, providing an amount of power equal to the difference between the power provided by the solar panel and the power needed to charge the battery pack to an output circuit;
if the battery pack is fully charged and the solar panel is receiving power, providing the power provided by the solar panel to an output circuit;
if the battery pack is fully or partially charged and the solar panel is not receiving power, using the battery pack to power an output circuit.

10. The method of claim 9, further comprising:
if the battery is charging and the current generated by the solar panel is above a predetermined current level, stopping the charging process;
if the battery is charging and the voltage generated by the solar panel is above a predetermined voltage level, stopping the charging process.

11. The method of claim 9, wherein the battery pack comprises at least two batteries connected in series, further comprising:
determining the charge level of each one of the at least two batteries;
for each battery, if the voltage of the battery exceeds the average voltage of the at least two batteries by a predetermined amount, turning on a bypass circuit to bypass that battery.

12. The method of claim 9, further comprising:
using at least one micro-inverter to generate alternating current at the output circuit.

13. A system for generating alternating current, comprising:
at least one solar panel connected to a bus;
a battery pack comprising at least one battery connected to the bus;
at least one micro-inverter connected to the bus;
a heater attached to the battery pack;
a temperature sensor attached to the battery pack;
a charging circuit connected to the battery pack;
a controller connected to the at least one micro-inverter, the heater, the temperature sensor, and the charging circuit, wherein the controller is configured to perform the following actions:
determining the temperature of the battery pack;
if the temperature of the battery pack is below a predetermined temperature during charging, turning off the charging circuit, turning on the heater to heat the battery pack, and turning on the charging circuit after the predetermined temperature is reached;
determining the voltage at the bus;
if the voltage at the bus is below a predetermined setpoint voltage and the solar panel is receiving power, turning off the at least one micro-inverter and charging the battery;
if the voltage at the bus is at or above a predetermined maximum voltage and the solar panel is generating more power than the maximum power of the micro-inverter, said predetermined maximum voltage higher than the predetermined setpoint voltage, turning off the battery charging circuit and turning on the at least one micro-inverter to maximum power;
if the voltage at the bus is at or above the predetermined setpoint voltage and the battery is not fully charged, turning on the at least one micro-inverter and keeping the charging circuit turned on, using the solar panel to charge the battery;

if the voltage at the bus is at or above the predetermined setpoint voltage and the battery is fully charged, turning on the at least one micro-inverter and turning off the charging circuit.

* * * * *